(12) United States Patent
Pettey

(10) Patent No.: US 10,710,501 B2
(45) Date of Patent: Jul. 14, 2020

(54) ASSISTED TRAILER ALIGNMENT SYSTEM

(71) Applicant: ROBOTZONE, LLC, Winfield, KS (US)

(72) Inventor: Brian T. Pettey, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 0 days.

(21) Appl. No.: 16/736,379

(22) Filed: Jan. 7, 2020

(65) Prior Publication Data

US 2020/0139884 A1 May 7, 2020

Related U.S. Application Data

(63) Continuation of application No. 16/571,521, filed on Sep. 16, 2019, which is a continuation of application No. 15/915,217, filed on Mar. 8, 2018, now Pat. No. 10,457,205.

(60) Provisional application No. 62/472,134, filed on Mar. 16, 2017.

(51) Int. Cl.
*B60Q 5/00* (2006.01)
*B60R 1/00* (2006.01)
*B60P 3/07* (2006.01)
*B60Q 9/00* (2006.01)

(52) U.S. Cl.
CPC ............... *B60Q 5/005* (2013.01); *B60P 3/07* (2013.01); *B60Q 9/00* (2013.01); *B60Q 9/007* (2013.01); *B60R 1/00* (2013.01); *B60R 2300/806* (2013.01)

(58) Field of Classification Search
CPC .......... H04N 7/183; H04N 7/181; B60D 1/36; B62D 13/06; B60G 67/04; B60Q 9/005; B60Q 9/008; B60Q 9/00; B60Q 9/007; B60Q 5/005; B60R 1/00; B60P 3/07
See application file for complete search history.

(56) References Cited

U.S. PATENT DOCUMENTS

| | | | | | |
|---|---|---|---|---|---|
| 3,626,896 | A | * | 12/1971 | Preeshl | E01F 9/60 116/33 |
| 4,236,479 | A | * | 12/1980 | Walker | B60Q 9/001 116/200 |
| 5,304,026 | A | * | 4/1994 | Liaw | E04H 6/245 414/253 |
| 5,328,199 | A | * | 7/1994 | Howe | B60D 1/36 280/477 |
| 5,825,305 | A | * | 10/1998 | Biferno | B64D 47/02 340/958 |
| 6,076,847 | A | * | 6/2000 | Thornton | B60D 1/36 280/477 |
| 6,661,516 | B1 | * | 12/2003 | Dietsch | B60S 3/002 356/399 |
| 7,396,035 | B1 | * | 7/2008 | Smith | B60D 1/36 280/477 |
| 7,536,242 | B2 | * | 5/2009 | Ledet | G05B 19/4207 156/353 |

(Continued)

*Primary Examiner* — Hoi C Lau
(74) *Attorney, Agent, or Firm* — Wesley W. Malherek; Kelly, Holt & Christenson PLLC

(57) ABSTRACT

A trailer alignment system is provided. The system comprises a sensor disposed within a housing. The system also comprises a processor configured to determine a location of a vehicle on a trailer based on data received from the sensor and in response to the vehicle location determination, the processor generates a notification. The system further comprises a notification element configured to display the generated notification to a driver of the vehicle.

20 Claims, 13 Drawing Sheets

(56) References Cited

U.S. PATENT DOCUMENTS

| | | | | |
|---|---|---|---|---|
| 7,568,881 B1* | 8/2009 | Collins | | B60P 1/6454 414/346 |
| 7,891,692 B2* | 2/2011 | Reichert | | B60D 1/36 280/477 |
| 8,678,701 B1* | 3/2014 | Aldasem | | E01F 13/085 256/13.1 |
| 9,630,545 B1* | 4/2017 | Corrigan | | B60P 1/38 |
| 9,794,552 B1* | 10/2017 | Ribble | | H04N 17/002 |
| 2001/0030688 A1* | 10/2001 | Asahi | | B60Q 9/005 348/118 |
| 2001/0039912 A1* | 11/2001 | Sutton | | B60Q 1/48 116/28 R |
| 2002/0174822 A1* | 11/2002 | Royal | | B60R 1/02 116/28 R |
| 2005/0102871 A1* | 5/2005 | Merle | | G09F 13/20 40/542 |
| 2006/0261574 A1* | 11/2006 | Milner | | B60D 1/36 280/477 |
| 2007/0046500 A1* | 3/2007 | Herbert | | G01S 7/497 340/932.2 |
| 2009/0040300 A1* | 2/2009 | Scribner | | B60R 1/00 348/143 |
| 2010/0086385 A1* | 4/2010 | Shani | | E04H 6/22 414/232 |
| 2010/0215433 A1* | 8/2010 | Fritz | | E01C 19/006 404/84.5 |
| 2010/0265048 A1* | 10/2010 | Lu | | B60Q 9/005 340/435 |
| 2011/0097187 A1* | 4/2011 | Kelley | | B66F 7/28 414/814 |
| 2011/0199232 A1* | 8/2011 | Healy | | B66F 7/28 340/932.2 |
| 2011/0216199 A1* | 9/2011 | Trevino | | B60D 1/36 348/148 |
| 2013/0309053 A1* | 11/2013 | Cameron | | B60P 3/1025 414/537 |
| 2014/0114466 A1* | 4/2014 | Luo | | B65G 1/0478 700/214 |
| 2014/0310967 A1* | 10/2014 | Nagornov | | G01B 21/26 33/301 |
| 2015/0168719 A1* | 6/2015 | Kim | | B60R 1/00 345/7 |
| 2016/0339824 A1* | 11/2016 | Dagenais | | B62D 63/061 |
| 2017/0129723 A1* | 5/2017 | Leum | | B65G 69/287 |
| 2017/0186247 A1* | 6/2017 | Thorley | | G07C 5/006 |
| 2017/0197550 A1* | 7/2017 | Navarro Zavala | | B60Q 1/48 |
| 2017/0253441 A1* | 9/2017 | Cooper | | B65G 69/287 |
| 2018/0194575 A1* | 7/2018 | Anderson | | B65G 67/04 |
| 2018/0265000 A1* | 9/2018 | Pettey | | B60Q 5/005 |
| 2020/0088515 A1* | 3/2020 | Rogers | | G01B 11/2755 |

* cited by examiner

VEHICLE ALIGNMENT SYSTEM 950

ALIGNMENT DEVICE 952

| HOUSING 958 | DISPLAY 960 |
|---|---|
| SENSOR 962 | SOFTWARE / FIRMWARE 966 |
| CIRCUITRY 964 | OTHER 968 |

TRAILER 954

| ENCLOSED 970 | OPEN 972 |
|---|---|
| BED 974 | WHEELWELLS 978 |
| WHEELS / AXLES 976 | OTHER 980 |

VEHICLE 956

| BODY 982 | WINDSHIELD 984 |
|---|---|
| TIRES 986 | OTHER 988 |

FIG. 9

ASSISTED TRAILER ALIGNMENT SYSTEM

CROSS-REFERENCE TO RELATED APPLICATION

The present application is based on and claims the benefit of U.S. provisional patent application Ser. No. 62/472,134, filed Mar. 16, 2017, and claims priority of U.S. patent application Ser. No. 15/915,217, filed Mar. 8, 2018, and is a continuation of and claims priority of U.S. patent application Ser. No. 16/571,521, filed Sep. 16, 2019, the content of which is hereby incorporated by reference in its entirety.

BACKGROUND

Auto racing is a growing sport, having many racing events nationwide. Also auto shows have become an American staple. Participants may be attending an event that is a substantial distance from their garage. To prevent wear on their participating vehicle when attending an event the participants do not drive their vehicles to the event. Instead, the participants transport their vehicles in a trailer when transporting them to the event. Typically, participants use an enclosed trailer to prevent any road damage to their competition vehicles. However, other trailers can also be used.

SUMMARY

A trailer alignment system is provided. The system comprises a sensor disposed within a housing. The system also comprises a processor configured to determine a location of a vehicle on a trailer based on data received from the sensor and in response to the vehicle location determination, the processor generates a notification. The system further comprises a notification element configured to display the generated notification to a driver of the vehicle.

BRIEF DESCRIPTION OF THE DRAWINGS

FIG. 9 is a block diagram of a vehicle alignment system in accordance with one embodiment of the present invention.

DETAILED DESCRIPTION OF ILLUSTRATIVE EMBODIMENTS

Figure 1:
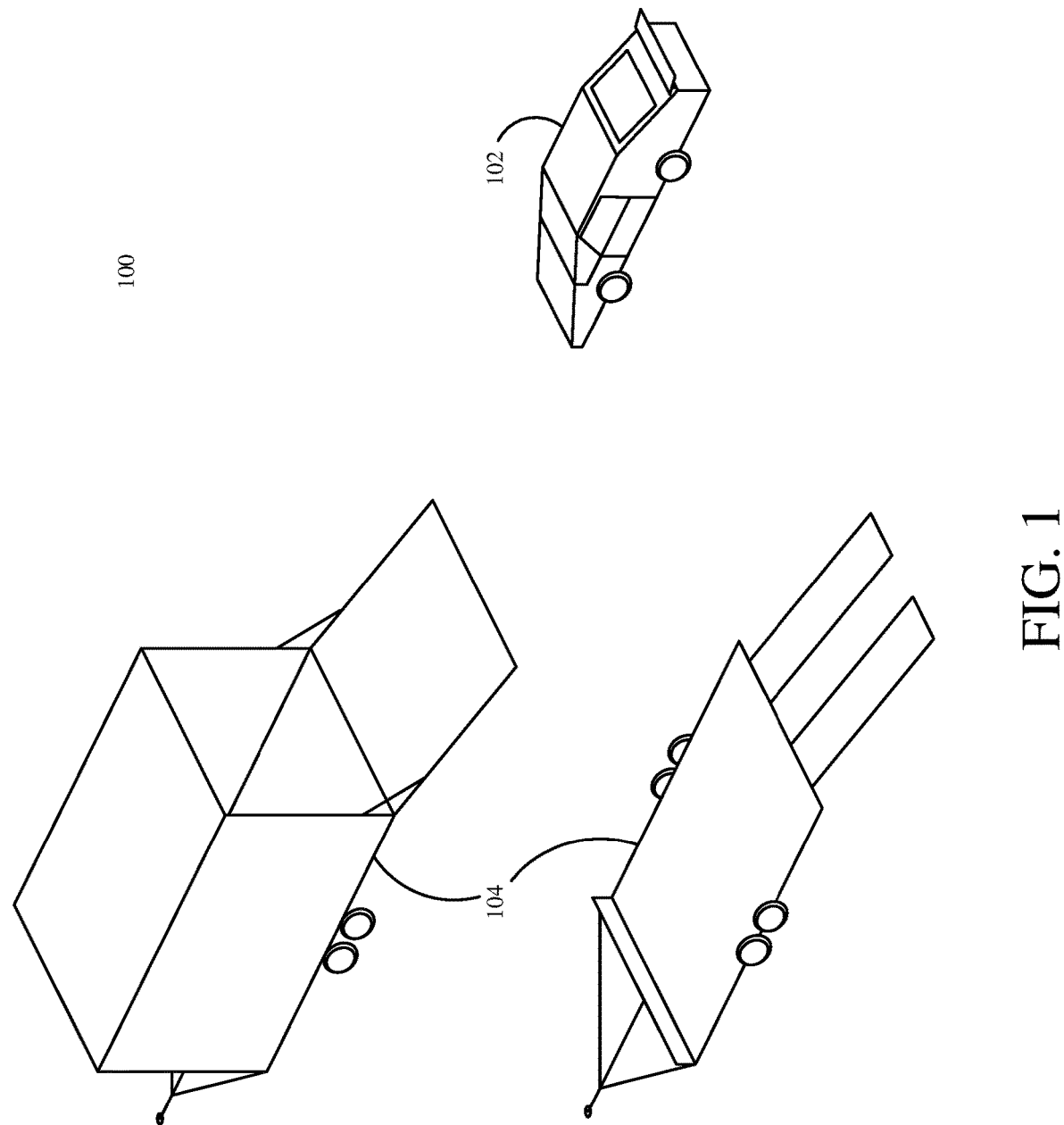
FIG. 1 illustrates trailers and vehicles in accordance with one embodiment of the present invention.

FIG. 1 illustrates trailers and vehicles in accordance with one embodiment of the present invention. Environment 100 comprises trailers 104 and vehicle 102. Trailers 104 may be an open trailer such as trailer 106 or may be an enclosed trailer, such as trailer 108. Each trailer 104 is configured to receive and transport vehicle 102. In one embodiment, trailers 104 are configured to store additional vehicles or items.

Figure 2:
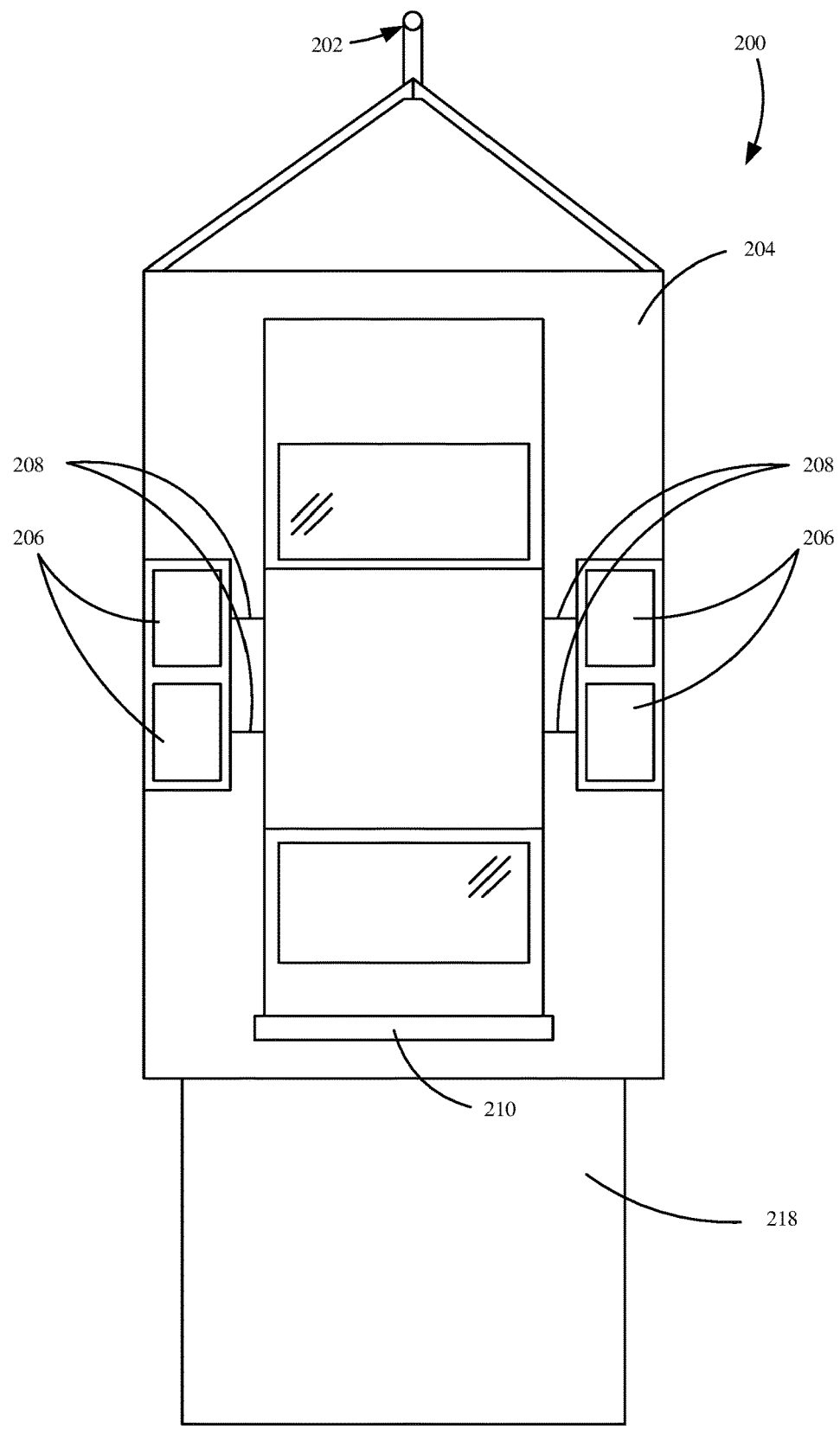
FIG. 2 illustrates a top view of a vehicle properly aligned on a trailer in accordance with one embodiment of the present invention.

FIG. 2 illustrates a top view of a vehicle properly aligned on a trailer in accordance with one embodiment of the present invention. Environment 200 comprises a vehicle 210 and a trailer 204. Trailer 204 comprises a connection 202, a bed 203, wheels 206, axles 208 and a ramp 218. Connection 202 connects the trailer to a towing vehicle (not shown, e.g. a truck). In one embodiment, connection 202 is a ball and socket. In another embodiment, connection 202 is a fifth-wheel connection. In a further embodiment, connection 202 is a gooseneck connection.

Bed 203, in one embodiment, is configured to support vehicle 210. Bed 203 may comprise a plurality of different materials including metal(s), synthetic(s) and/or wood(s). Bed 203 is functionally coupled to and supported by axles 208. As shown, trailer 204 comprises two axles 208. However, trailer 204 could have fewer or additional axles 208.

Wheels 206 are coupled to axles 208. Wheels 206 and axles 208 normally hold a majority of the weight of trailer 204 and its hauling contents. As shown, each axle 208 is coupled to two wheels 206. In one embodiment, there are more than two wheels 206 per axle 208. In one embodiment, wheels 206 are located beneath bed 203. However, wheels 206 could also be located outside of bed 203. Wheels 206 could also be located within bed 203 and are protected by wheel wells. Utilization of wheel wells may restrict usable space on bed 203 which may lead to a tougher vehicle alignment process of vehicle 210. In one embodiment, wheels 206 comprise brakes independent of the towing vehicle.

Vehicle 210 is loaded on to trailer 204 through a loading mechanism 218. As shown loading mechanism 218 is a solid flat ramp. However, mechanism 218 can comprise two individual tire ramps. Mechanism 218 may also be loading bay equipment.

Normally, trailer 204 and vehicle 210 combination have a specific ideal configuration that better distributes weight of vehicle 210 on trailer 204. For example, this configuration requires substantially an even distribution of weight across tires 206 (i.e. each side of the trailer carries the same weight as the other side). Such a configuration may provide better safety, a smoother ride and even tire wear between sides of the trailer. The ideal configuration can require a tongue weight of 10% to 20% of the total trailer weight. This configuration may provide any or all of the following: better control, safety, a smoother ride and even wear on trailer components. Because of these benefits, users towing a vehicle ideally place the vehicle at a known good position on a trailer. Properly placing the vehicle in this position can be difficult.

Figure 3:
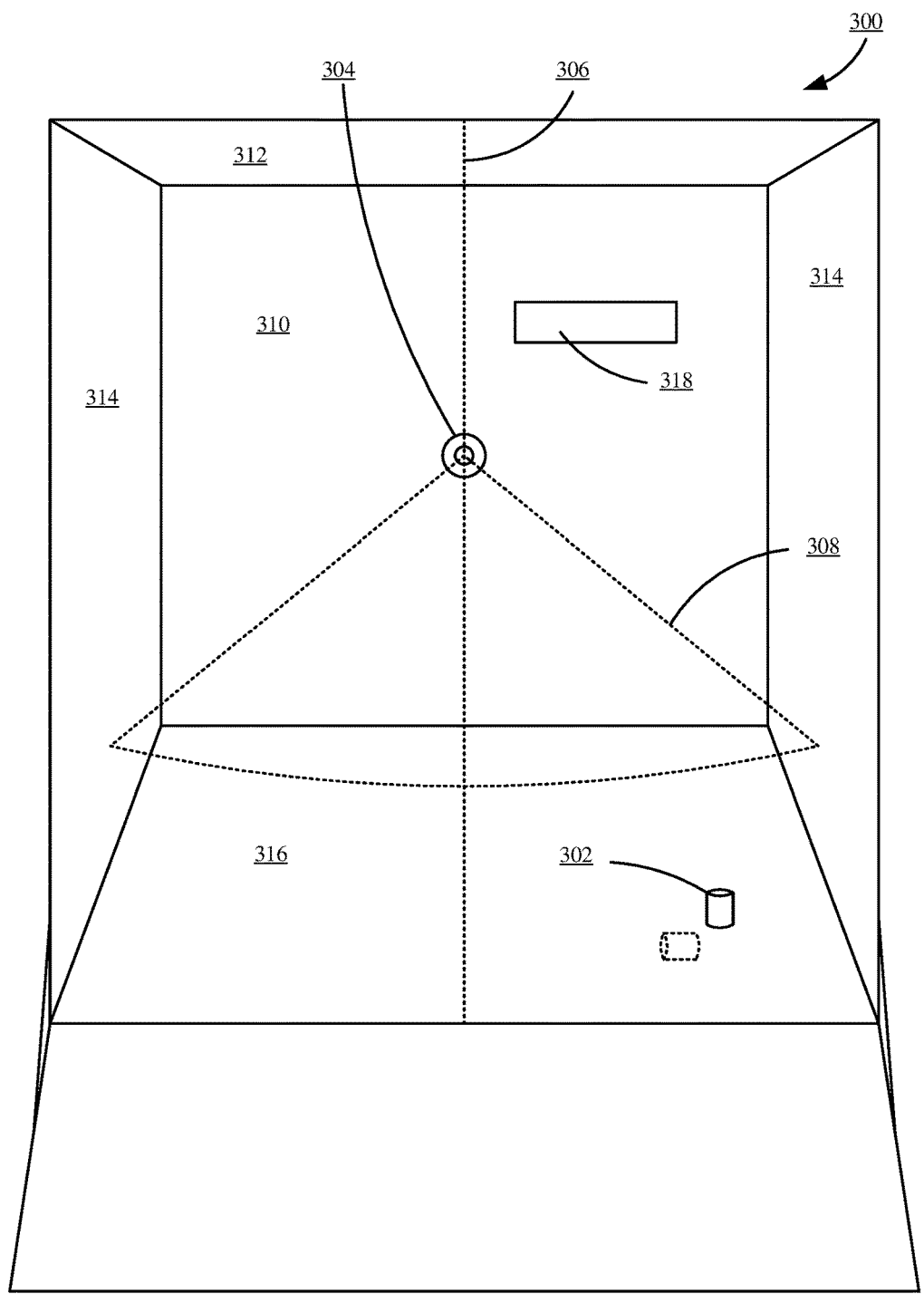
FIG. 3 illustrates a rear view of a trailer alignment system in accordance with one embodiment of the present invention.

FIG. 3 illustrates a rear view of a trailer alignment system in accordance with one embodiment of the present invention. Trailer 300 comprises a back wall 310, sidewalls 314, a ceiling 312 and a bed 316. Coupled to bed 316, as shown, is marker 302. In one embodiment, marker 302 is tape. In one embodiment, marker 302 is paint or other marketing materials. Commonly, haulers mark where vehicles are best aligned through the use of a marker 302. This does ensure proper alignment however, a driver driving the vehicle onto trailer 300 cannot see marker 302 themselves and therefore require help or must exit the vehicle and check themselves. It is desired for a system that allows a driver to align their vehicle without help.

Coupled to back wall 310 is alignment system 304. In other embodiments, alignment system 304 is coupled to a different trailer surface (e.g. any of sidewalls 314, ceiling 312 or bed 316). Alignment system 304 may be powered by an internal battery or a power source located on the trailer. Alignment system 304 may also be powered by the towing vehicle. Alignment system 304 projects a vertical laser line 306 and a horizontal laser line 308. The position of vertical laser line 306 and horizontal laser line 308 can be adjusted by alignment system 304. In one embodiment, adjustments are made manually at system 304. In one embodiment, adjustments are made remotely. For example, through a mobile application on a mobile device. Vertical laser line 306 can be used by a driver as a point of reference for left-right vehicle alignment. Horizontal laser line 308 can be used by a driver as a point of reference for forward-backward vehicle alignment.

Figure 4:
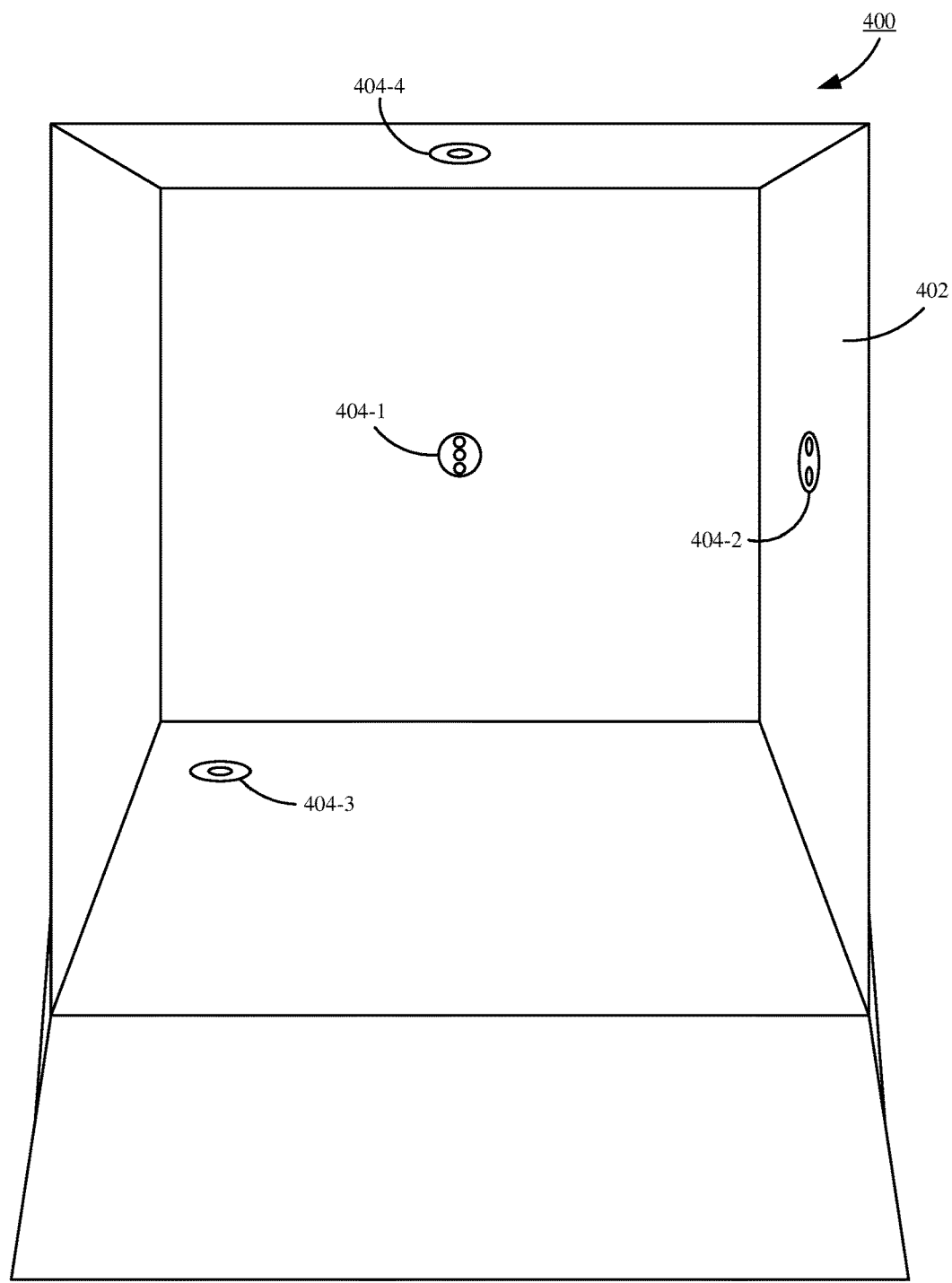
FIG. 4 illustrates a review of a trailer alignment system in accordance with one embodiment of the present invention.

FIG. 4 illustrates a review of a trailer alignment system in accordance with one embodiment of the present invention. Trailer 400 comprises interior surfaces 402, a sensor 404 and a display 418. In one embodiment, sensor 404 comprises a camera. In one embodiment, sensors 404 comprise lasers or lidar/lidar arrays. In another embodiment sensors 404 comprise a different type of sensor e.g. camera. Sensor 404 as shown are on multiple surfaces 402. In one embodiment, sensors 404 are only on a single surface 402. Sensors 404 detect the location of a vehicle entering trailer 400. In one embodiment, sensors can detect the location of a vehicle before it begins its entry into trailer 400.

Display 418 can display notifications to the driver of a vehicle entering trailer 400. In one embodiment, display 418 is a set of lights, e.g. LED. Display 418 could also be a LCD/LED screen or the like. In one embodiment, displays 418 comprised fixed light up displays. As shown multiple displays 418 can be attached to multiple surfaces 402. In one embodiment, there are more than one display 418. Some of the notifications that display 418 can display to the driver include: enter trailer, drive forward, drive backward, drive left, drive right, exit trailer, reenter trailer, etc. In one embodiment, there are no displays 418 on surfaces 402, instead notifications are received through another channel. Some examples of other channels include on board vehicle displays or mobile devices, e.g. through a mobile phone app.

Figure 5:
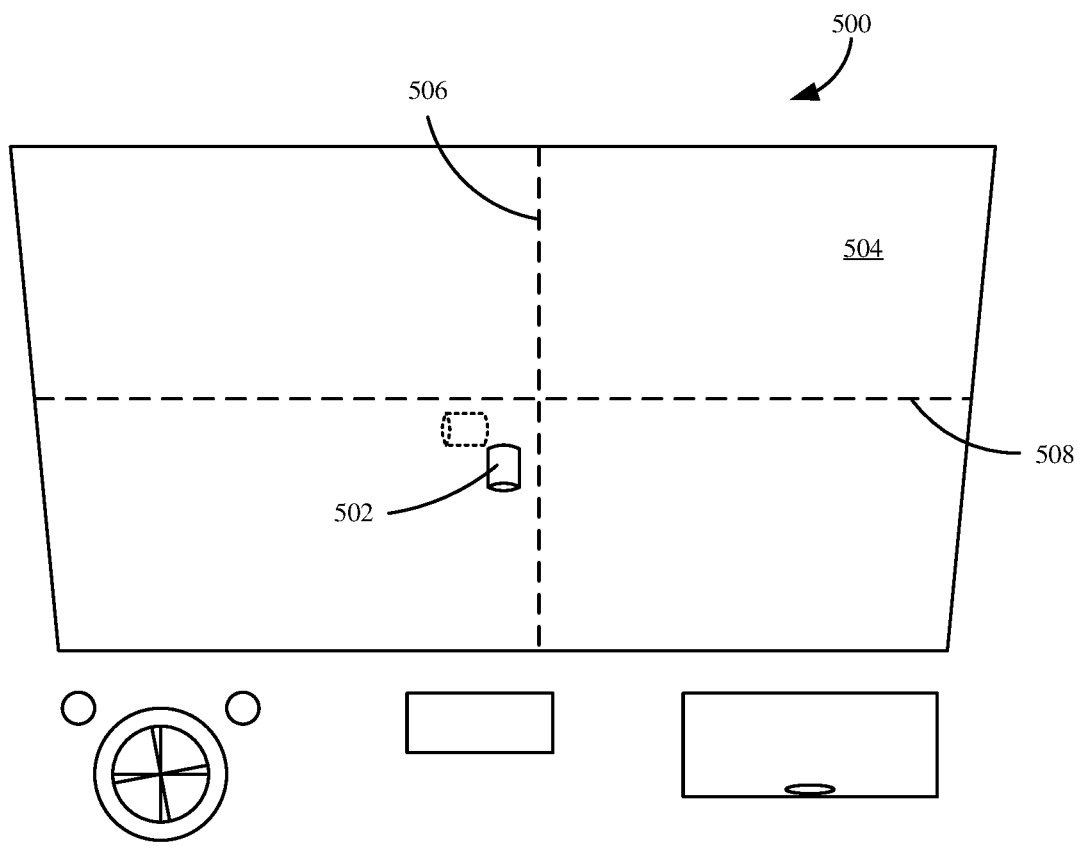
FIG. 5 illustrates an interior view of a vehicle during trailer alignment in accordance with one embodiment of the present invention.

FIG. 5 illustrates an interior view of a vehicle during trailer alignment in accordance with one embodiment of the present invention. Environment 500 illustrates a point of view, for example, from a driver driving a vehicle into a trailer. View 500 illustrates a windshield 504, a vertical laser line 506, a horizontal laser line 508 and markers 502. Vertical laser line 506 and horizontal laser line 508 can provide point of references for the driver while they are aligning the vehicle within the trailer. Markers 502 as shown are placed on the windshield 504 as points of reference for the driver. As shown there are only two markers 502. In one embodiment, there are more, e.g. 3, 4 or 5 markers 502. In one embodiment, markers 502 are tape. In one embodiment, markers 502 are made of a composition that reacts to light. A reaction to light may further emphasize when the marker 502 contacts a laser. When vertical laser line 506 and horizontal laser line 508 are in a known good configuration with markers 502 the driver knows that they are in the correct location.

A known configuration, in one embodiment, might be that marker 502 contacts the laser lines 506, 508 at the intersection of the laser lines 506, 508. The known good configuration in another embodiment might be that a first marker 502 contacts horizontal laser line 508 at the same time a second marker contacts vertical laser line 506. In such a scenario, the greater the distance between markers 502, the more accurate the alignment will be. The known good configuration may be also be a different configuration for different scenarios.

Figure 6A:
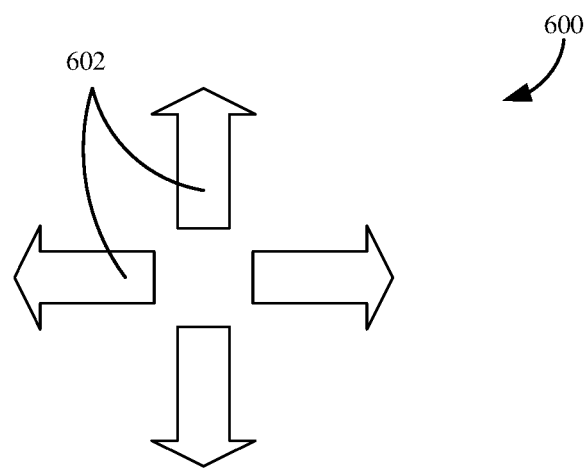
FIG. 6A-B illustrate trailer aligning notifications in accordance with embodiments of the present invention.

FIG. 6A illustrates a trailer aligning notification in accordance with one embodiment of the present invention. Notification system 600, in one embodiment, comprise arrows 602 and stop 604. Arrows 602 can, for example, light up or otherwise notify the driver. For example, an up arrow indicates to drive forward and a left arrow indicates to drive left. Stop 604 can light up or otherwise notify the driver. For example, stop 604 can indicate that the driver has piloted the vehicle to the correct position.

Figure 6B:
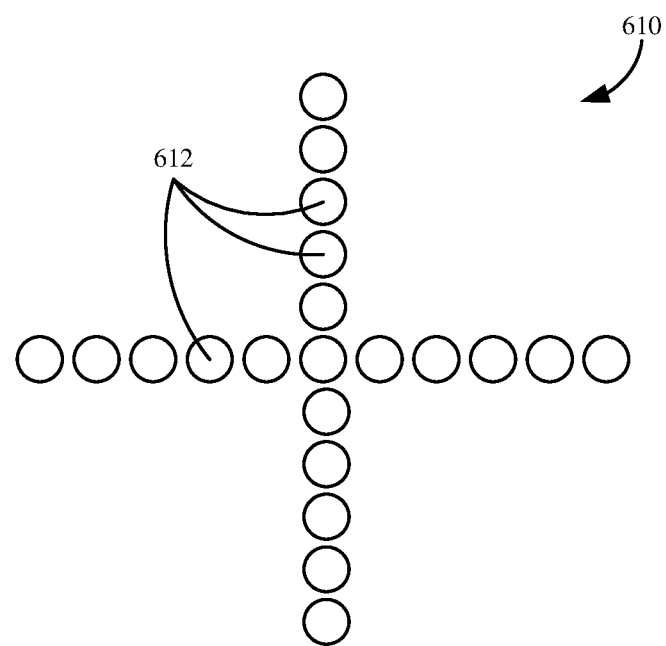

FIG. 6B illustrates a trailer aligning notification in accordance with one embodiment of the present invention. Notification 610 comprises an array of indicators 612. In one embodiment, indicator 612 is an individual LED or an array. In one embodiment, an LED array may light up corresponding to where the vehicle is located in the trailer. For example, if the vehicle is located slightly to the left and rear of where the vehicle should be positioned, then the lights to the left and bottom will be illuminated and as the vehicle gets closer to the correct position the lights will be illuminated closer to the center. In on embodiment lights can indicate where to go, e.g. to the right and forward.

Figure 7A:
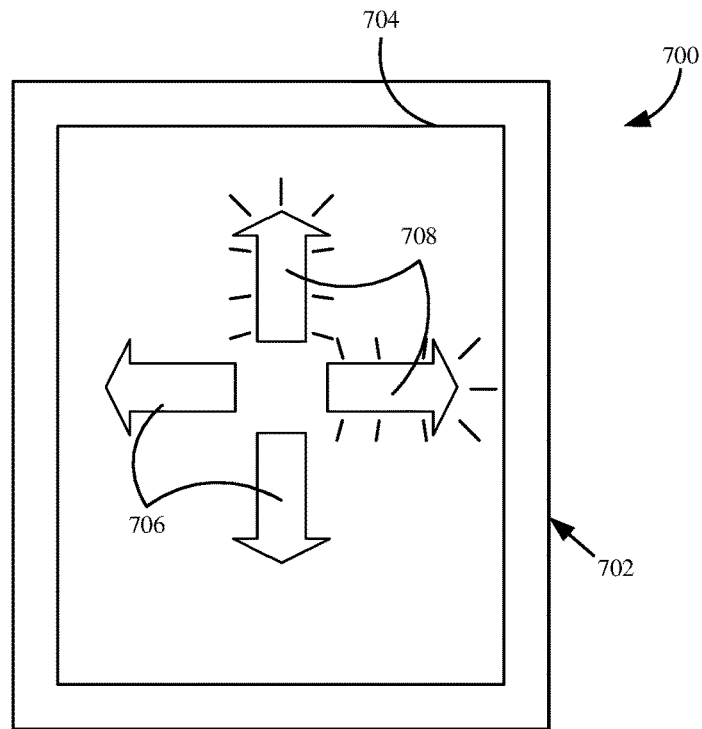
FIG. 7A-B illustrate trailer aligning notifications on a mobile device in accordance with embodiments of the present invention.

FIG. 7A illustrates a trailer aligning notification on a mobile device in accordance with one embodiment of the present invention. Mobile environment 700 comprises a mobile device 702 with a display 704. Displayed on display 704 are inactive icons 706 and active icons 708. Active icons 708 notify the driver of the vehicle to continue driving forward and to the right. In addition to the mobile device display icons 706, 708, the mobile device 702 may also, in one embodiment, generate audible and/or haptic notifications.

Figure 7B:
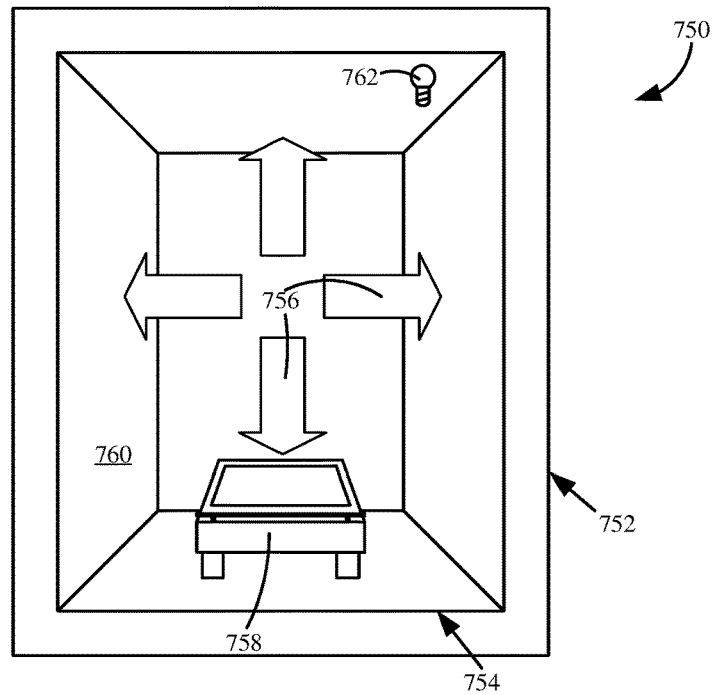

FIG. 7B illustrates a trailer aligning notification on a mobile device in accordance with one embodiment of the present invention. Mobile environment 750 comprises a mobile device 752 with a display 754. Displayed on display 754 are notifications 756 superimposed over a camera feed 764. Camera feed 764, as shown comprises a vehicle 758 within a trailer 760. Also superimposed over camera feed 764 is, for example, miscellaneous item 762. Miscellaneous item 762, can be a button that turns a light on in the trailer. Miscellaneous items 762, in one embodiment, is a button that switches the spectrum of the camera. For example, element 762 can actuate between visible light to a night vision spectrum of light.

Figure 8:
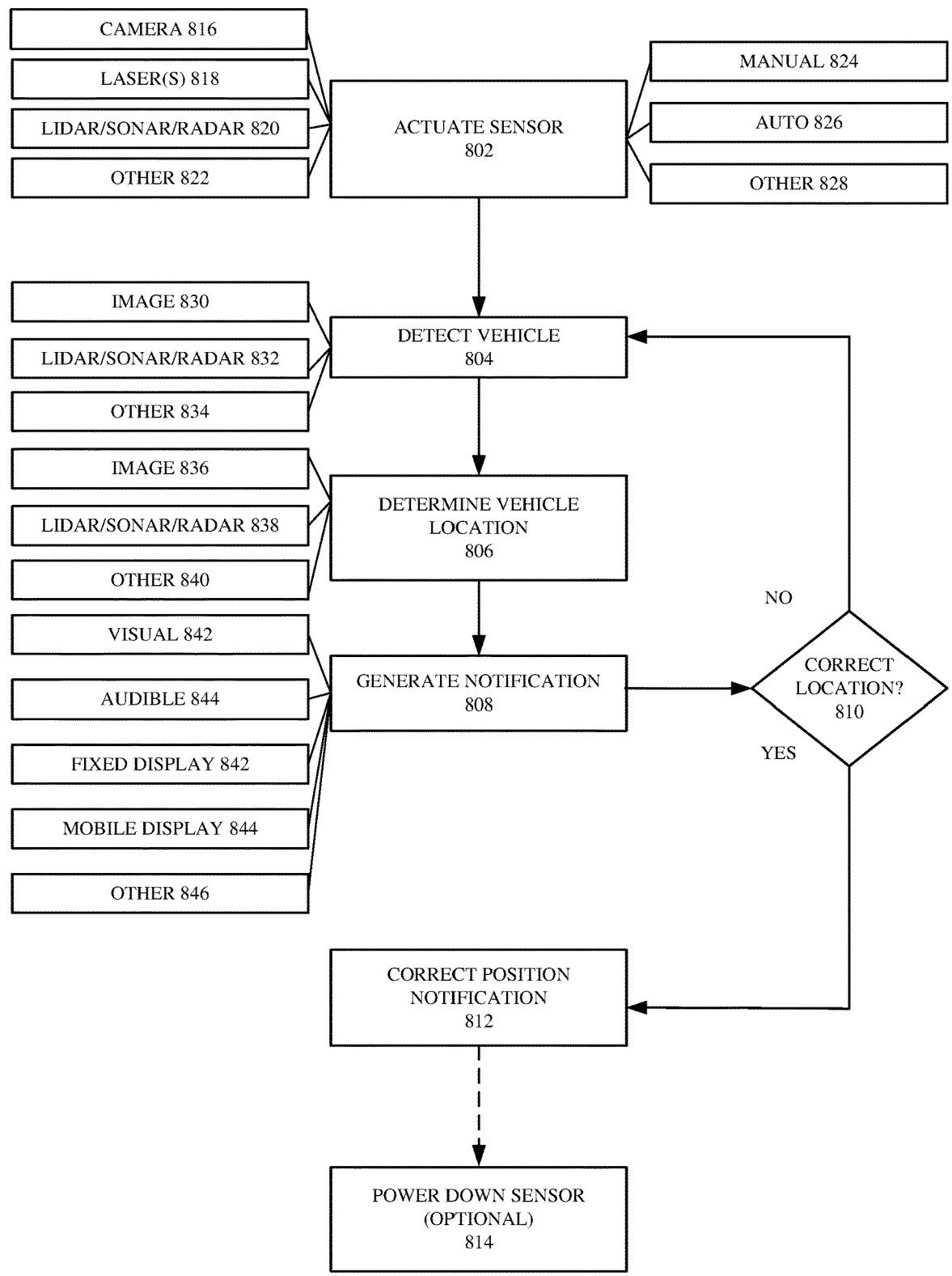
FIG. 8 illustrates a method for vehicle trailer alignment in accordance with one embodiment of the present invention.

FIG. 8 illustrates a method for vehicle trailer alignment in accordance with an embodiment of the present invention. Method 800 begins at block 802. At block 802 the sensor is turned on. In one embodiment, the sensor is a camera as indicated by block 816. In one embodiment, the sensor is a laser as indicated by block 818. In one embodiment, the sensor is a lidar, sonar, radar as indicated by block 820 or an array of any suitable sensors. The sensor may also be some other sensor as indicated by block 822. The sensor can be turned on automatically as indicated by block 826 or manually as indicated by block 824. Automatically may involve turning the sensor on when the trailer loading mechanism is activated. Manually may involve activating a mechanism on the sensor. Manually may also involve remote activation. The sensor may be actuated in some other manner as well as indicated by block 828.

At block 804, the vehicle is detected by the sensor. In one embodiment, the vehicle is detected before it enters the trailer. In one embodiment, the vehicle is detected when contacting or entering the trailer. The sensor data used may be an image as indicated by block 830 or a lidar/sonar/radar reading as indicated by block 832. The sensor data used may also be some other type of data as indicated by block 834.

At block 806, the vehicle's location is determined. In one embodiment, the vehicle's location is determined by the sensor. The sensor data may be an image as indicated by block 836. The sensor data may be a lidar/sonar/radar reading as indicated by block 838. The sensor data may also be some other type of sensor data as indicated by block 840. In one embodiment, the vehicle's location is determined by a processor coupled to the sensor. To calculate the vehicle's location, in one embodiment, the processor may analyze images provided by the camera. In this analysis, the processor looks for a specific point or points of a vehicle and determines if they are in the correct position for proper alignment. For example, the camera takes video or a plurality of images of the car entering the trailer, while the processor tracks location of the tires of the vehicle, such that when the tires reach a certain position, the car is also in the correct position. In another embodiment, the specific points may not be the tires, but instead be a point on the car body, windshield, mirrors, lights, etc.

At block 808, a notification is generated based at least in part on the vehicles location. The notification can be visual 842. The notification can be audible 844. In one embodiment, the notification is one of the notifications from FIGS. 7A-B. In one embodiment, the notification is a different notification. Notification is generated is also displayed on a display visible to the driver of the vehicle. The display, in one embodiment, is on a mobile device 844. The display, in one embodiment, is located on a fixed display 842. For example, a display on the wall of the trailer. The display may also be another type of notification as indicated by block 846.

At block 810, it is determined if the vehicle is in the correct location. If the vehicle is not in the correct location, method 800 continues at block 804 where the vehicle is detected. If the vehicle is in the correct location method 800 continues at block 812. In one embodiment, the condition at block 810 must be met for a given amount of time. This prevents the driver from entering the correct position and then continuing to drive out of the correct position. In one embodiment, there is a tolerance associated with the correct position. The tolerance may allow the car to be a given distance away from the exact position yet still be close enough for the desired positive effects.

At block 812, a correct position notification is generated. In one embodiment, the notification is a visual notification. In one embodiment, the notification is a audible notification. The correct position notification, in one embodiment, is presented using a mobile device.

At block 814, the sensor is optionally powered down. In one embodiment, the sensor remains fully functional and operational after alignment. This may be desired to detect shifting/movement during transport. A notification can alert the driver that the sensor and display are about to be powered down. Powered down can comprise the sensor in an active state but only responsive to large changes in sensor data. For example, similar to a security camera changing frame rates based on detection of a person. Powered down can also mean the sensor completely turning off.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 9 is a block diagram of a vehicle alignment system in accordance with one embodiment of the present invention. Vehicle alignment system 950 comprises alignment device 952, trailer 954 and vehicle 956. In one embodiment, alignment device 952 comprises housing 958, display 960, sensor 962, circuitry 964 and software/firmware 966. Alignment device 952 may also comprise other components 968. Vehicle alignment system 950 may comprise more than one alignment device 952. Housing 958 can house some or all of the other components of alignment device 952. Housing 958 can be made to be driven over by vehicle 956. Housing 958 can be mounted on any surface of trailer 954. Housing 958 can also be mounted on a surface of vehicle 956. Display 960 displays notifications or other indications to a driver in order for the driver to know whether the vehicle 956 they are piloting is in the correct position. Display 960 can be projected from housing 958, i.e. lasers. Display 960 can be separate from alignment device 952, for example, mounted on a different interior surface of trailer 954. Display 960 can be a screen. Display 960 can be an LED or an array of LEDs. Display 960 can be a user interface on a mobile device. Display 960 can also comprise a speaker. Sensor 962 can be a variety of different sensors including lidar, sonar, radar, camera, etc. Sensor 962 can comprise more than one sensor 962. Circuitry 964 provides a logic to control alignment device 952. Circuitry 964 can comprise a processor, memory and inputs/outputs. Circuitry 964 can also store software/firmware 966. Circuitry 964 or software/firmware 966 can also store different ideal locations for different vehicles 956.

Trailer 954, in one embodiment, comprises bed 974, wheels/axles 976, wheel wells 978. Trailer 954 may also comprise other components 980. Trailer 954 can be an enclosed 970. Trailer 954 can be open 972. Bed 974 can be comprised of any suitable material, for example wood or metal. Bed 974 is supported by wheels/axles 976. Trailer 954 can comprise one set of wheels/axles 976. Trailer 954 can also comprise more than one set of wheels/axles 976 (tandem axle). Trailer 954 can comprise two wheels per axle or can comprise more than two wheels per axle. Wheels/axles 976 can be protected by wheel wells 978. Wheel wells 978 can be located outside of trailer bed 974. Wheel wells 978 can be located within the trailer bed 974, such that wheel wells 978 restrict usable space on bed 974. Wheel wells 978 can be located underneath bed 974, such that they don't restrict usable space on bed 974.

Vehicle 956, in one embodiment comprises body 982, windshield 984 and tires 986. Vehicle 956 may also comprise other components 988. Sensor 962 of alignment device 952 detects a component of vehicle 956 to determine if vehicle 956 is in correct alignment. Body 982 can be readily visible to sensor 962. However, body 982 may shift or not be symmetrical, meaning body 982 might not be the best component to judge alignment by sensor 962. Windshield 984 can also be readily visible to sensor 962 and/or display 960. In an embodiment where display 960 is a laser/laser line, windshield 984 can be used to judge alignment of vehicle 956. Tires 986 can be readily visible to sensor 962. Tires 986 are an ideal way of judging proper alignment of vehicle 956 because tires 986 support the weight of vehicle 956.

Figure 10:
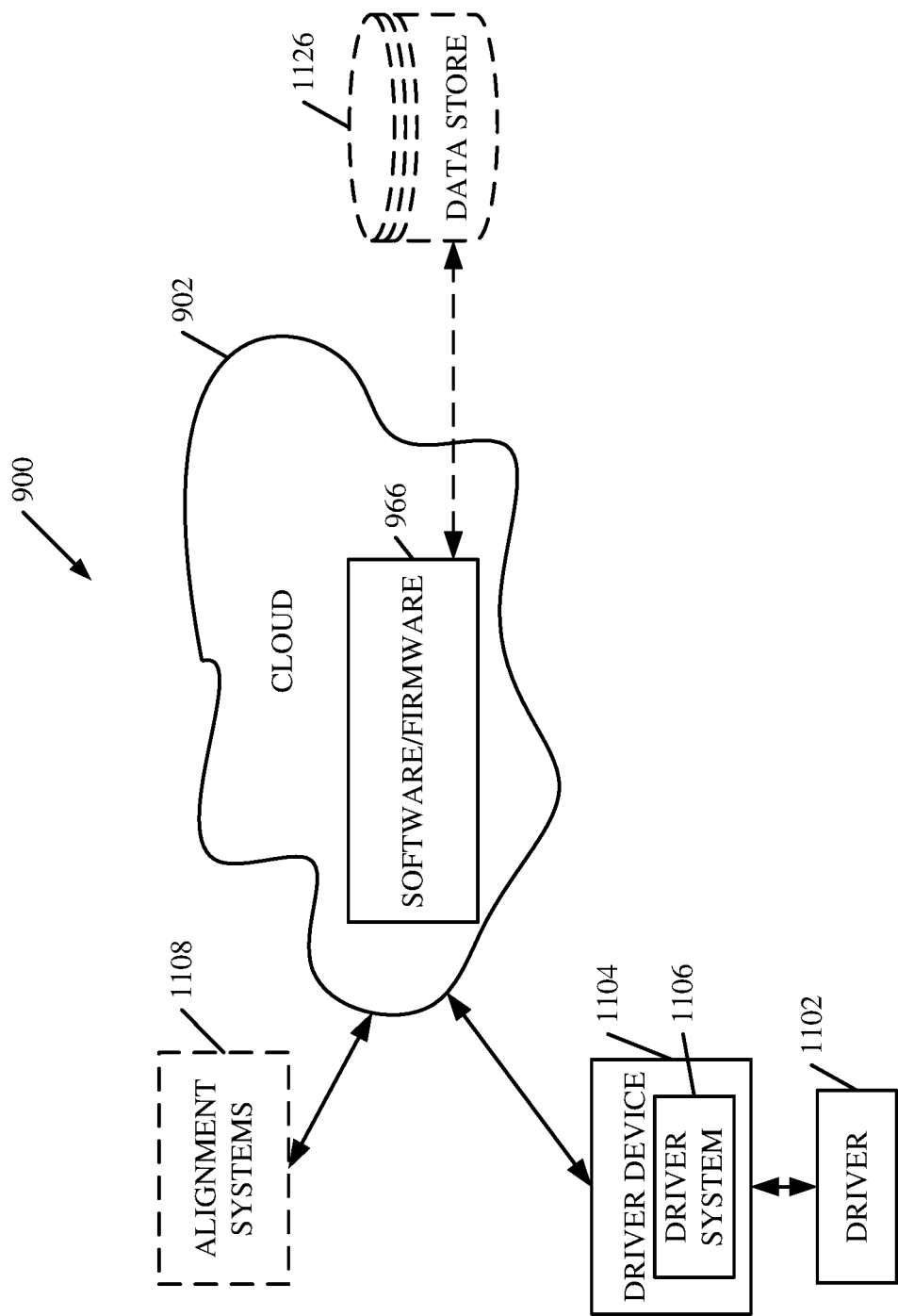
FIG. 10 is a block diagram of software/firmware disposed in a cloud computing architecture.

FIG. 10 is a block diagram of software/firmware 966, shown in FIG. 9, except that its elements are disposed in a cloud computing architecture 900. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 966 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 10, some items are similar to those shown in FIG. 9 and they are similarly numbered. FIG. 10 specifically shows that software/firmware 966 can be located in cloud 902 (which can be public, private, or a combination where portions are public while others are private). Therefore, driver 1102 uses a driver device 1104 and driver system 1106 to access alignment systems 1108 through cloud 902. Driver 1102 uses a driver device 1104 and driver system 1106 to datastore 1126 through cloud 902. Software/firmware 966 can access data located in datastore 1126.

Figure 11:
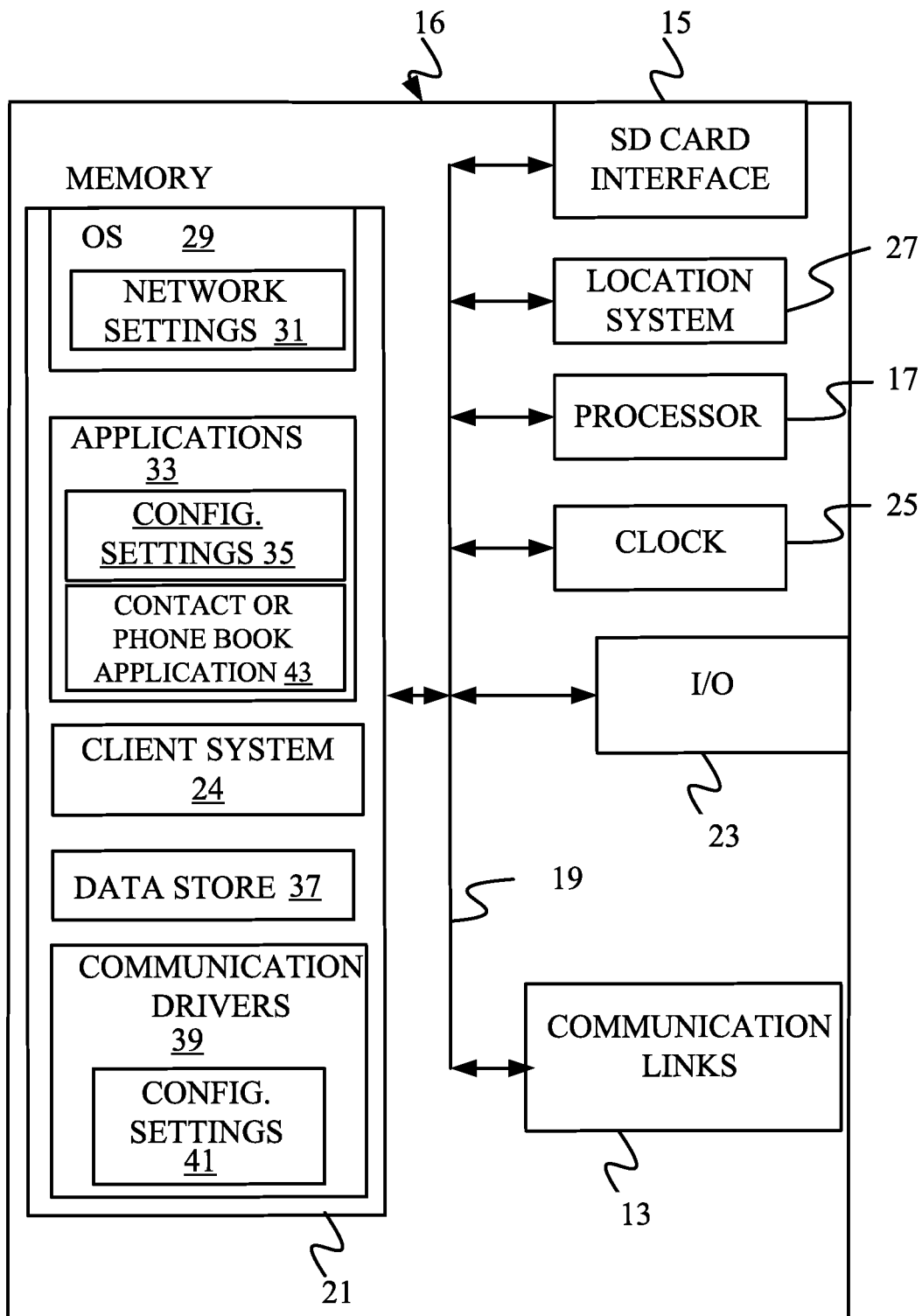
FIG. 11 provides a general block diagram of the components of a client device.

FIG. 11 provides a general block diagram of the components of a client device 1104 that can run components of architecture 966 or that interacts with architecture 966, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 12:
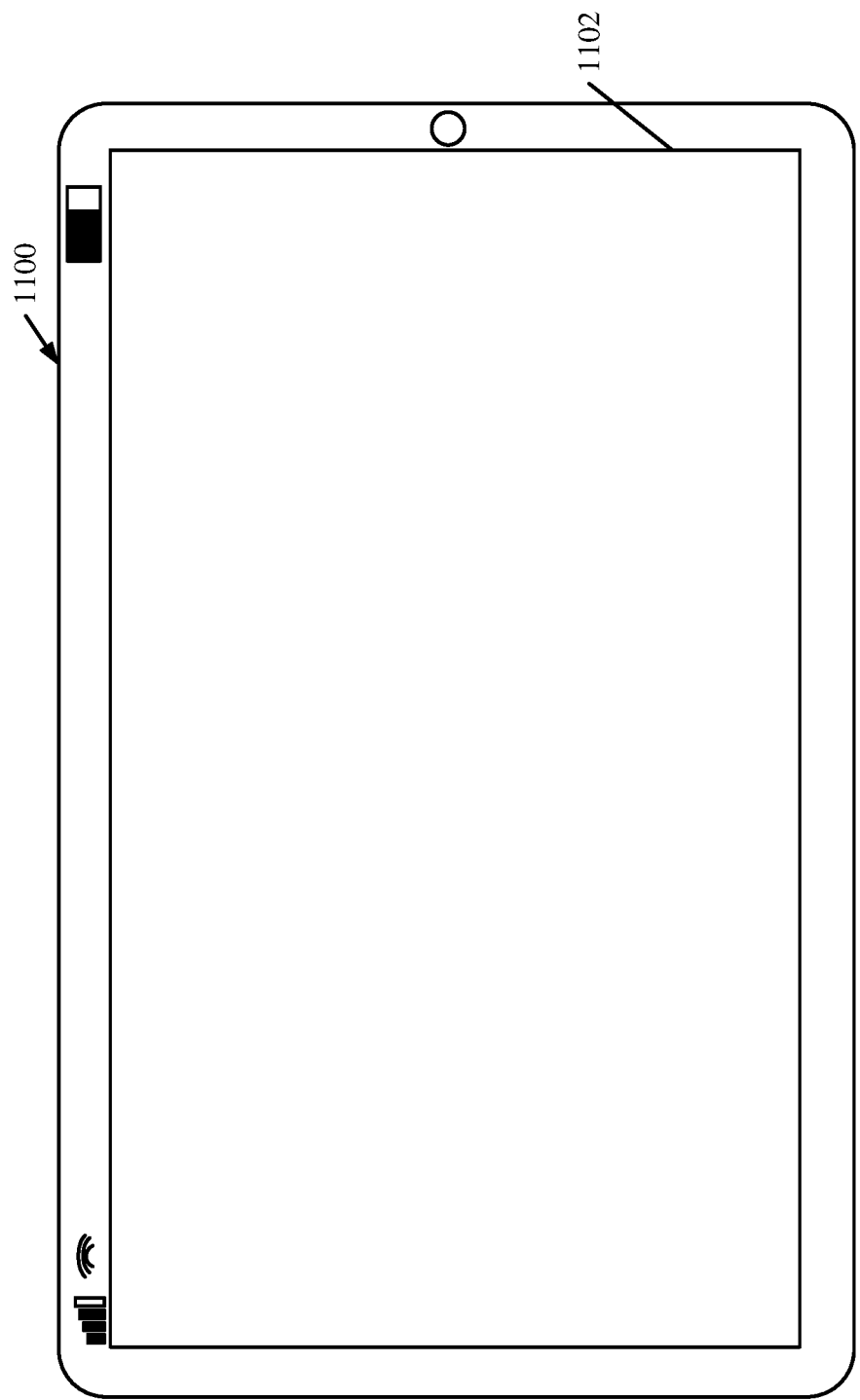
FIG. 12 shows one example in which the device is a tablet computer.

FIG. 12 shows one example in which device 16 is a tablet computer 1100. In FIG. 12, computer 1100 is shown with user interface display screen 1102. Screen 1102 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1100 can also illustratively receive voice inputs as well.

Device 16 can be a smart phone 1100. Smart phone 1100 has a touch sensitive display 602 that displays icons or tiles or other user input mechanisms. Mechanisms can be used by a user to run applications, make calls, perform data transfer operations, etc. In general, smart phone 16 is built on a mobile operating system and offers more advanced computing capability and connectivity than a feature phone.

Note that other forms of the devices 16 are possible.

Figure 13:
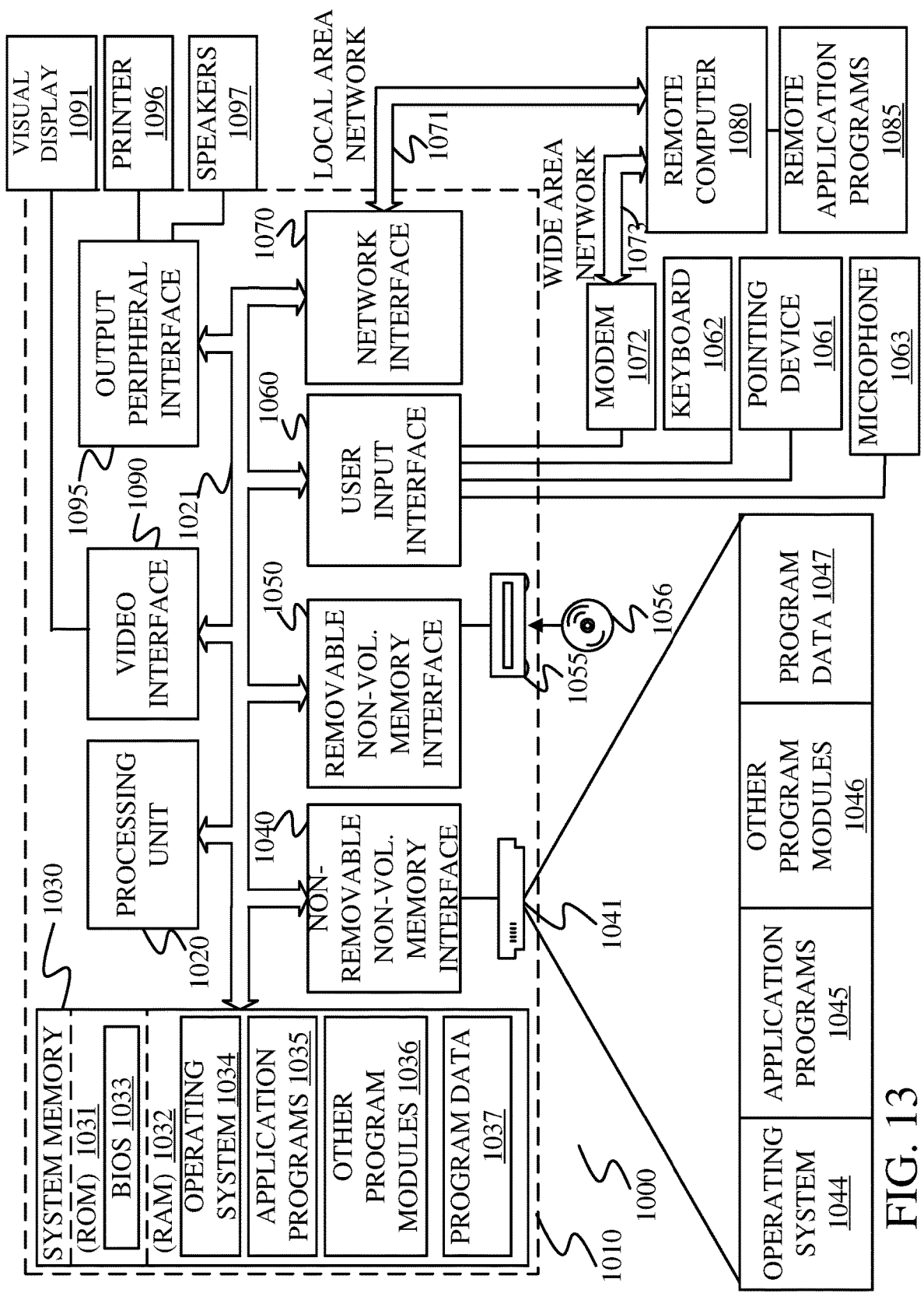
FIG. 13 is one example of a computing environment in which a software/firmware can be deployed.

FIG. 13 is one example of a computing environment in which software/firmware 966, or parts of it, (for example) can be deployed. With reference to FIG. 13, an example system for implementing some embodiments includes a general-purpose computing device in the form of a computer 1010. Components of computer 1010 may include, but are not limited to, a processing unit 1020 (which can comprise processors or servers from previous Figures), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 13 illustrates operating system 1034, application programs 1035, other program modules 1036, and program data 1037.

The computer 1010 may also include other removable/non-removable volatile/nonvolatile computer storage media. By way of example only, FIG. 13 illustrates a hard disk drive 1041 that reads from or writes to non-removable, nonvolatile magnetic media, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The hard disk drive 1041 is typically connected to the system bus 1021 through a non-removable memory interface such as interface 1040, and optical disk drive 1055 are typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1010. In FIG. 13, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections to one or more remote computers, such as a remote computer 1080. The remote computer 1080 may be a personal computer, a hand-held device, a server, a router, a network PC, a peer device or other common network node, and typically includes many or all of the elements described above relative to the computer 1010. The logical connections depicted in FIG. 13 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 13 illustrates remote application programs 1085 as residing on remote computer 1080. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

What is claimed is:

1. A method of setting up a system for guiding a vehicle into a substantially even left-right alignment, the substantially even left-right alignment meaning the car is positioned so as to be substantially the same distance from left and right sides of a vehicle supporting device when the vehicle is within the vehicle supporting device, wherein the vehicle supporting device is configured to support full weight of the vehicle, and wherein the method comprises:

mounting a vertical line generator on the vehicle supporting device in a location such that a vertical line emitted from the vertical line generator will project across a hood portion of the vehicle as the vehicle approaches the vehicle supporting device.

2. The method of claim 1, wherein said location is such that the vertical line emitted from the vertical line generator will also project across a windshield portion of the vehicle as the vehicle approaches the car supporting device.

3. The method of claim 1, wherein said location is such that the vertical line emitted from the vertical line generator will be substantially equidistant from the left and right sides of the vehicle supporting device.

4. The method of claim 1, wherein said location is such that the vertical line emitted from the vertical line generator will be emitted to a location out in front of the vehicle supporting device in an area the vehicle passes through prior to entering the vehicle supporting device.

5. The method of claim 1, wherein said location is such that the vertical line emitted from the vertical line generator will be projected outside of the vehicle supporting device.

6. The method of claim 1, wherein the location is such that the vertical line will be emitted from the vertical line generator so as to create a visual centerline outside of the vehicle supporting device, wherein the visual centerline would be substantially equidistant from the left and right sides when extended to a location inside the vehicle supporting device.

7. The method of claim 1, wherein the vertical line generator is a laser line projector.

8. The method of claim 1, wherein mounting comprise attaching the vertical line generator to the vehicle supporting device.

9. A method of setting up a system for guiding a vehicle into a substantially even left-right alignment, the substantially even left-right alignment meaning the car is positioned so as to be substantially the same distance from left and right sides of a vehicle supporting device when the vehicle is within the vehicle supporting device, wherein the vehicle supporting device is configured to support full weight of the vehicle, and wherein the method comprises:

mounting a vertical line generator on the vehicle supporting device in a location such that a vertical line emitted from the vertical line generator will project out in front of the vehicle supporting device across an area through which the vehicle must pass through in order to enter the vehicle supporting device.

10. The method of claim 9, wherein mounting comprises attaching the vertical line generator to the vehicle supporting device.

11. The method of claim 9, wherein the vertical line generator is a laser line projector.

12. The method of claim 9, wherein the vertical line is oriented to serve as a visual centerline outside of the vehicle supporting device.

13. The method of claim 9, wherein the vertical line is oriented to operate as an indicator outside of the vehicle supporting device of a centerline of the vehicle supporting device.

14. A method of setting up a system for guiding a vehicle into a substantially even left-right alignment, the substantially even left-right alignment meaning the car is positioned so as to be substantially the same distance from left and right sides of a vehicle supporting device when the vehicle is within the vehicle supporting device, wherein the vehicle supporting device is configured to support full weight of the vehicle, and wherein the method comprises:

mounting a vertical line generator on the vehicle supporting device in a location such that a vertical line emitted from the vertical line generator operates as an indicator outside of the vehicle supporting device of a centerline of the vehicle supporting device.

15. The method of claim 14, wherein mounting comprises attaching the vertical line generator to the vehicle supporting device.

16. The method of claim 14, wherein the vertical line generator is a laser line projector.

17. The method of claim 14, wherein mounting comprises mounting in a location such that the vertical line emitted will cross the hood of the vehicle as the vehicle approaches the vehicle supporting device.

18. The method of claim 14, wherein the vertical line generator is a line projector.

19. The method of claim 14, wherein mounting further comprises mounting in a location such that the indicator outside of the vehicle shows visibly on a hood portion of the vehicle as the vehicle approaches the vehicle supporting device.

20. The method of claim 14, wherein the vehicle supporting device is a trailer.

* * * * *